United States Patent
Kawakoya et al.

(10) Patent No.: US 10,129,275 B2
(45) Date of Patent: Nov. 13, 2018

(54) INFORMATION PROCESSING SYSTEM AND INFORMATION PROCESSING METHOD

(71) Applicant: NIPPON TELEGRAPH AND TELEPHONE CORPORATION, Chiyoda-ku (JP)

(72) Inventors: Yuhei Kawakoya, Musashino (JP); Makoto Iwamura, Musashino (JP); Takeo Hariu, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 14/891,588

(22) PCT Filed: Mar. 27, 2014

(86) PCT No.: PCT/JP2014/058952
§ 371 (c)(1),
(2) Date: Nov. 16, 2015

(87) PCT Pub. No.: WO2014/185165
PCT Pub. Date: Nov. 20, 2014

(65) Prior Publication Data
US 2016/0088007 A1    Mar. 24, 2016

(30) Foreign Application Priority Data

May 16, 2013  (JP) ................. 2013-104481

(51) Int. Cl.
*H04L 29/06* (2006.01)
*G06F 21/52* (2013.01)
*G06F 21/56* (2013.01)
*G06F 9/455* (2018.01)
*G06F 21/55* (2013.01)
(Continued)

(52) U.S. Cl.
CPC ...... *H04L 63/1425* (2013.01); *G06F 9/45545* (2013.01); *G06F 21/52* (2013.01);
(Continued)

(58) Field of Classification Search
CPC ............. H04L 63/1425; H04L 63/1416; G06F 9/45545; G06F 21/52; G06F 21/552; G06F 21/566
See application file for complete search history.

(56) References Cited

U.S. PATENT DOCUMENTS

2009/0328218 A1   12/2009  Tsurukawa
2011/0145918 A1   6/2011   Jung et al.
(Continued)

FOREIGN PATENT DOCUMENTS

CN   102054149 A1   5/2011
CN   102521543 A    6/2012
(Continued)

OTHER PUBLICATIONS

Kemerlis et al., (libdft: Practical Dynamic Data Flow Tracking for Commodity Systems, VEE'12, Mar. 3-4, 2012, 12 pages).*
(Continued)

*Primary Examiner* — Oleg Korsak
(74) *Attorney, Agent, or Firm* — Oblon, McClelland, Maier & Neustadt, L.L.P.

(57) ABSTRACT

An information processing device and method that monitor a behavior of malware (program), and generate a log which associates identification information of an invoked library function, input data to the library function, output data from the library function and a taint tag for uniquely specifying output data every time the program invokes a library function. Further, the information processing device and method refer to a taint tag set to output data from an information processing device and a log, track a dependent relationship between items of data input and output to and from libraries and specify a library function which has generated the output data from the information processing device.

6 Claims, 8 Drawing Sheets

(52) U.S. Cl.
CPC .......... *G06F 21/552* (2013.01); *G06F 21/566* (2013.01); *H04L 63/1416* (2013.01); *G06F 2221/2101* (2013.01)

(56) References Cited

U.S. PATENT DOCUMENTS

| | | |
|---|---|---|
| 2012/0047391 A1 | 2/2012 | Dhoolia et al. |
| 2012/0066698 A1 | 3/2012 | Yanoo |
| 2013/0086676 A1 | 4/2013 | Chess et al. |

FOREIGN PATENT DOCUMENTS

| | | |
|---|---|---|
| JP | 4755658 A | 8/2011 |
| WO | 2010/134325 A1 | 11/2010 |
| WO | WO 2013/067505 A1 | 5/2013 |

OTHER PUBLICATIONS

Sharif et al., (Automatic Reverse Engineering of Malware Emulators, 2009 IEEE, pp. 94-109).*

Wang et al. (CN 102054149 Method for extracting malicious code behavior characteristic, Feb 13, 2013, 8 pages).*

Clemens Kolbitsch, et al. "Effective and Efficient Malware Detection at the End Host", USENIX Security Symposium, Aug. 2009, https://www.usenix.org/legacy/event/sec09/tech/full_papers/kolbitsch.pdf.

International Search Report dated Jul. 1, 2014 for PCT/JP2014/058952 filed on PCT/JP2014/058952.

Extended European Search Report dated Oct. 21, 2016 in Patent Application No. 14797772.2.

Decision of a Patent Grant dated Oct. 4, 2016 in Japanese Patent Application No. 2015-516986 (with English translation).

Combined Office Action and Search Report dated May 18, 2017 in Chinese Patent Application No. 201480028447.8 (with English translation and English translation of category of Cited Documents).

Office Action dated Aug. 2, 2016 in Japanese Patent Application No. 2015-516986 (with English translation).

Decision of a Patent Grant issued Oct. 4, 2016 in Japanese Patent Application No. 2015-516986 (with English translation).

* cited by examiner

FIG.4

SHADOW MEMORY

| VIRTUAL PHYSICAL MEMORY ADDRESS | TAINT TAG | |
|---|---|---|
| | TWO-BIT INFORMATION | ONE-BIT INFORMATION |
| 0000 TO 0200 | 1 | 1 |
| 0310 TO 0350 | 0 | 5 |
| ... | ... | ... |

FIG.5

SHADOW DISK

| VIRTUAL DISK ADDRESS | TAINT TAG | |
|---|---|---|
| | TWO-BIT INFORMATION | ONE-BIT INFORMATION |
| 1000 TO 1200 | 1 | 7 |
| 1410 TO 1450 | 0 | 5 |
| ... | ... | ... |

FIG.6A

```
LOG EXAMPLE (SAME TAINT TAG IS SET TO EACH LIBRARY FUNCTION)

FORMAT [prev|post] FUNCTION NAME, ARGUMENT #;OUT|IN: DATA: TAINT TAG

...
[prev] GetComputerName,ARGUMENT 1:OUT, ARGUMENT 2:IN:5
[post] GetComputerName,ARGUMENT 1:OUT:'yamada':tag=0x1, ARGUMENT 2:IN
[prev] memcpy,ARGUMENT 1:OUT, ARGUMENT 2:IN:'yamada':tag=0x1
[post] memcpy,ARGUMENT 1:OUT:'yamada':tag=0x1,ARGUMENT 2:IN
[prev] send,ARGUMENT 1:IN...,ARGUMENT 2:IN:'yamada':tag=0x1, ARGUMENT...
...
```

FIG.6B

```
LOG EXAMPLE (SAME TAINT TAG IS SET PER EACH LIBRARY FUNCTION)

FORMAT [prev|post] FUNCTION NAME, ARGUMENT #;OUT|IN: DATA: TAINT TAG

...
[prev] GetComputerName,ARGUMENT 1:OUT, ARGUMENT 2:IN:5
[post] GetComputerName,ARGUMENT 1:OUT:'yamada':tag=0x1, ARGUMENT 2:IN
[prev] memcpy,ARGUMENT 1:OUT, ARGUMENT 2:IN:'yamada':tag=0x1
[post] memcpy,ARGUMENT 1:OUT:'yamada':tag=0x2,ARGUMENT 2:IN
[prev] send,ARGUMENT 1:IN...,ARGUMENT 2:IN:'yamada':tag=0x2, ARGUMENT...
...
```

INFORMATION PROCESSING SYSTEM AND INFORMATION PROCESSING METHOD

FIELD

The present invention relates to an information processing device and an information processing method.

BACKGROUND

Dynamic analysis is used to cause an execution file to actually operate in analysis environment and obtain a behavior of the execution file to analyze a behavior of an analysis target execution file such as malware. The dynamic analysis includes a network behavior analysis-type dynamic analysis which monitors packets to be propagated from malware to an outside (Patent Literature 1).

According to this network behavior analysis-type dynamic analysis, it is possible to obtain information such as a communication destination, a port number, a protocol and a payload of the malware. Depending on cases, important information for understanding a malware behavior is observed from a payload portion in some cases. When, for example, information such as a machine name, user information and contents of confidential files are described in a payload portion, it is possible to determine that this malware makes a behavior of propagating confidential information of an infected terminal to an outside.

However, most of items of recent malware obfuscate communication data by way of encryption or compression. In such a case, it is not possible to learn contents of data which is being propagated, based on a payload portion of a packet which can be observed by the network behavior analysis-type dynamic analysis, and therefore it is not possible to understand a malware behavior.

There is a method of statically analyzing an execution file of malware and specifying contents of data which is being propagated in such a case. This method is a method of causing an analyzer to manually dissemble an execution file of malware and grasping a behavior of malware by interpreting an instruction. However, static analysis of malware is very costly, and is not suitable for analyzing a great amount of execution files.

CITATION LIST

Patent Literature

Patent Literature 1: Japanese Patent No. 4755658

SUMMARY

Technical Problem

As described above, when malware obfuscates data and outputs the data to an outside of an analysis environment machine upon dynamic analysis of malware, it is not possible to specify an original meaning of this data by observing output data. Further, theoretically speaking, an analyzer can grasp contents of obfuscated data by manually performing static analysis yet requires not only a special skill to perform the static analysis but also a great amount of time for analysis, and therefore labor is very costly.

It is therefore an object of the present invention to solve the above problem, and specify source information of data by dynamic analysis even when the data is obfuscated by a program such as malware and is output to an outside.

Solution to Problem

To solve the problems described above, an information processing device which specifies a library function invoked to generate output data, the information processing device comprising: a library function execution monitoring unit which, when an analysis log of a monitoring target program is generated, captures a library function invoked by the monitoring target program, and sets a tag for uniquely identifying the invocation of the library function, to the output data from the library function every time the library function is invoked; a log storage unit which stores the analysis log including the output data from the library function; and a log searching unit which specifies a library function invoked to generate the output data from the information processing device by using as a key the tag set to the analysis log stored in the log storage unit.

Advantageous Effects of Invention

According to the present invention, it is possible to specify source information of data by dynamic analysis even when the data is obfuscated by a program such as malware and is output to an outside.

BRIEF DESCRIPTION OF DRAWINGS

FIG. 4 is a view illustrating an example of information stored in a shadow memory.

FIG. 5 is a view illustrating an example of information stored in a shadow disk.

FIG. 6A is a view illustrating an example of logs in case where a taint tag is propagated between library functions.

FIG. 6B is a view illustrating an example of logs in case where a new taint tag is set per library function.

DESCRIPTION OF EMBODIMENTS

First Embodiment

[Entire Configuration]

Figure 1:
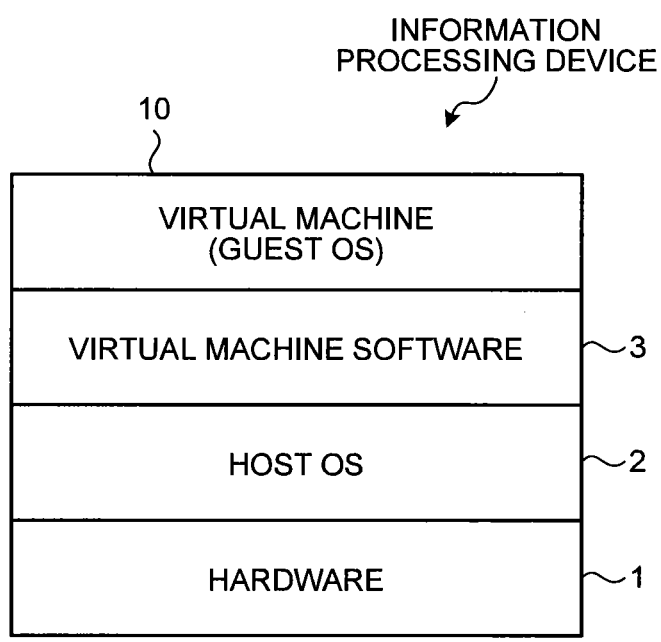
FIG. 1 is a view illustrating an entire configuration of an information processing device.

Modes (embodiments) for carrying out the present invention will be described. FIG. 1 is a view illustrating an entire configuration of an information processing device.

As illustrated in FIG. 1, the information processing device includes hardware 1, a host OS 2, virtual machine software 3 and a virtual machine 10.

The hardware 1 is an electronic circuit or a peripheral device which configures the information processing device, and is, for example, a memory or a CPU (Central Processing Unit). The host OS 2 is an OS which is a base to cause the virtual machine to operate, and is executed by using the hardware 1. The virtual machine software 3 is software which provides the virtual machine by using the hardware 1, and causes the virtual machine 10 to operate. For example, the virtual machine software 3 allocates a virtual disk, a virtual physical memory and a virtual CPU to a guest OS, and causes the virtual machine to operate.

The virtual machine 10 is, for example, a emulator virtual machine, and is a virtual information processing device which causes a guest OS to operate by using a virtual disk, a virtual physical memory and a virtual CPU provided from the virtual machine software 3, and executes various types of processing.

Figure 2:
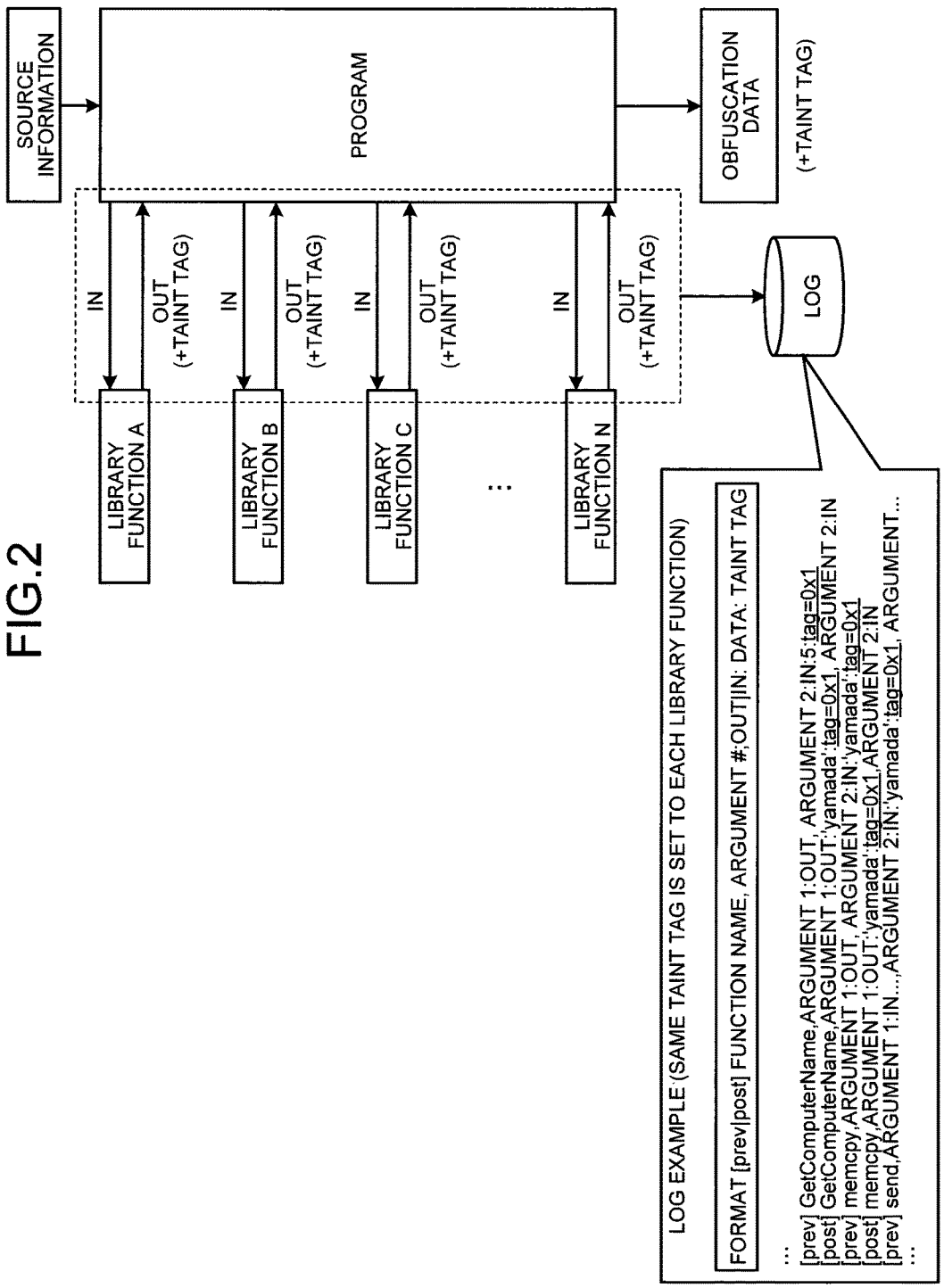
FIG. 2 is a view illustrating an outline of processing of the information processing device.

An outline of processing of this information processing device will be described with reference to FIG. 2. FIG. 2 is a view illustrating the outline of processing of the information processing device. The information processing device monitors a program (malware) which is a behavior analysis target in the virtual machine 10. Further, the information processing device monitors a program behavior, and generates and outputs logs related to an input and an output of library functions invoked by this program.

Each library function is a function invoked every time the program is executed, and is, for example, an API (Application Programming Interface), a system call or a local function. Each library function is included in a guest OS. Further, a case where a library function is Win32API will be described below as an example. However, the present invention is not limited to this.

Further, logs generated by the information processing device are, for example, pieces of information indicating library functions (e.g. library functions A, B, C, . . . and N), input data to each library function and output data from each library function. In this regard, the information processing device sets a taint tag (tag) for uniquely identifying an invocation of each library function, to output data from each library function upon generation of logs.

Meanwhile, the information processing device causes a behavior analysis target program to operate, and analyzes a taint. That is, the information processing device propagates a taint tag to data of an execution result of an instruction by causing a behavior analysis target program to operate when data to which the taint tag has been set is passed as an operand to an instruction to be executed by a virtual CPU. Thus, the information processing device sets the taint tag set by the information processing device, to input data to a library function invoked by the program, too.

Under such analysis environment, the information processing device causes the behavior analysis target program to operate for a predetermined period, generates and outputs logs related to an input and an output of library functions and accumulates logs.

Subsequently, when outputting some obfuscated data (obfuscation data), the information processing device tracks a dependent relationship between items of data used between library functions and specifies a library function (e.g. library function A) which has generated the obfuscation data by referring to a taint tag set to this data and a taint tag included in the log. By specifying the library function in this way, a user of the information processing device can specify what type of information is source information based on characteristics of this library function upon generation of obfuscation data.

In addition, in the present embodiment, a data output means, for example, that data is output to an outside from a machine (virtual machine 10) which causes an analysis target program to operate through a network or that data is output to the outside by being written in a recording medium such as a hard disk, a semiconductor memory, a DVD or a CD-ROM.

[Configuration of Virtual Machine]

Next, a configuration of the virtual machine illustrated in FIG. 1 will be described. In addition, the hardware 1, the host OS 2 and the virtual machine software 3 employ the same configurations as general configurations, and therefore will not be described in detail. In addition, in the following description, a monitoring target program is stored in advance in a virtual disk 11a, and a taint tag is set thereto.

Figure 3:
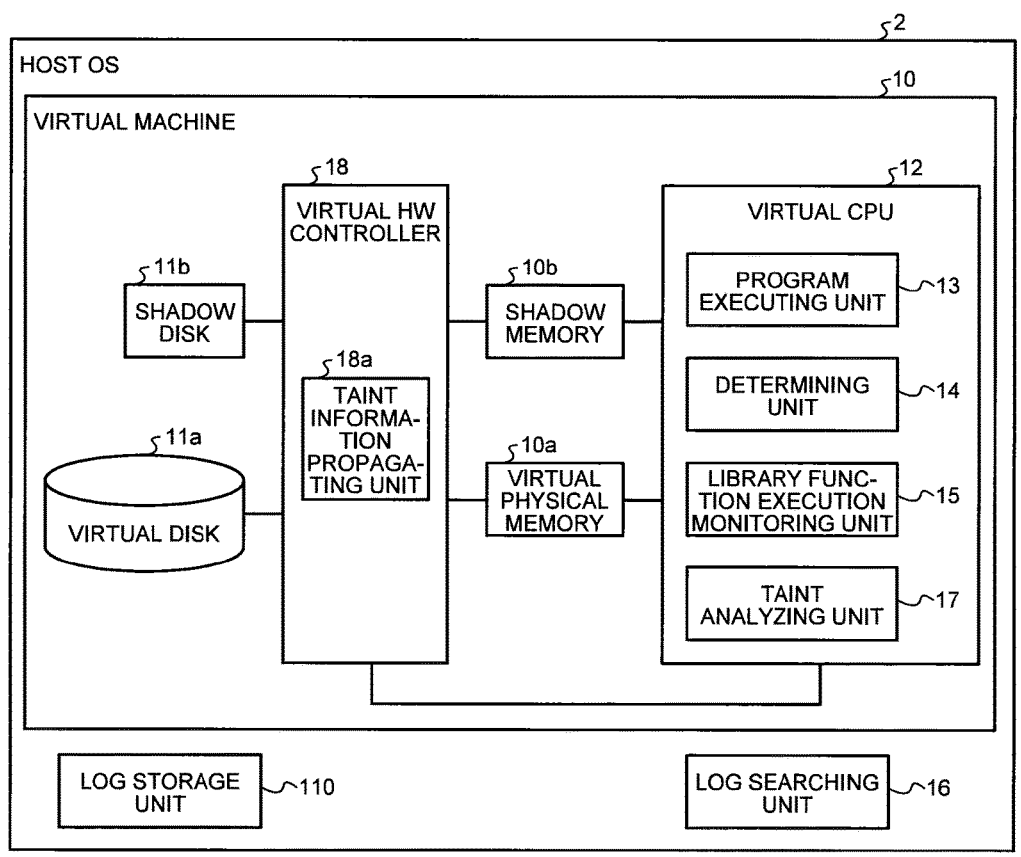
FIG. 3 is a view illustrating a functional configuration of a virtual machine.

FIG. 3 is a view illustrating a functional configuration of the virtual machine. In FIG. 3, the virtual machine 10 includes a virtual physical memory 10a, a shadow memory 10b, the virtual disk 11a, a shadow disk 11b, a virtual CPU 12 and a virtual HW controller 18.

The virtual physical memory 10a is a virtual memory which is realized by allocating a predetermined region in a physical memory included in the information processing device as a memory which a guest OS which operates in the virtual machine 10 uses. For example, the virtual physical memory 10a stores programs or data read from the virtual disk 11a by the virtual CPU 12.

The shadow memory 10b is a data structure which holds values of taint tags set to values on the virtual physical memory 10a.

Hereinafter, an example of the shadow memory 10b will be described. FIG. 4 is a view illustrating an example of information stored in the shadow memory. As illustrated in FIG. 4, the shadow memory 10b associates and stores a "virtual physical memory address" and a "taint tag". The "virtual physical memory address" is position information indicating a storage position on the virtual physical memory 10a, and the "taint tag" is an identifier set to data output as a result of execution of each library function.

FIG. 4 illustrates that a taint tag "11" is allocated to a monitoring target program code stored in addresses "0000 to 0200" of the virtual physical memory 10a. Further, a taint tag "05" is allocated to monitoring target data stored in addresses "0310 to 0350" of the virtual physical memory 10a. In addition, the numerical values illustrated in FIG. 4 are exemplary, and by no means limit values.

The virtual disk 11a is a virtual disk which is realized by allocating a predetermined region in a physical disk included in the information processing device as a region used which a guest OS which operates on the virtual machine 10 uses. For example, the virtual disk 11a stores execution target programs executed by the virtual CPU 12, and processing target data of the programs. This virtual disk 11a includes in the predetermined region a log storage unit 110 which stores logs related to an input and an output of library functions.

The shadow disk 11b is a data structure which holds values of taint tags set to values on the virtual disk 11a.

Hereinafter, an example of the shadow disk 11b will be described. FIG. 5 is a view illustrating an example of information stored in the shadow disk. As illustrated in FIG. 5, the shadow disk 11b associates and stores a "virtual disk address" and a "taint tag". The "virtual disk address" is position information indicating a storage position on the virtual disk 11a, and the "taint tag" is an identifier for identifying a monitoring target. Further, two-bit information of the "taint tag" which is "1" indicates that monitoring target data is a program code.

The virtual CPU 12 in FIG. 3 is a virtual CPU which is realized by allocating predetermined processing performance in the physical CPU included in the information processing device as a CPU used which the guest OS which operates on the virtual machine 10 uses. This virtual CPU 12 includes a shadow register which holds taint tags held in this virtual CPU 12. This virtual CPU 12 includes a program executing unit 13, a determining unit 14, a library function execution monitoring unit 15 and a taint analyzing unit 17, and executes various types of processing by using the program executing unit 13, the determining unit 14, the library function execution monitoring unit 15, and the taint analyzing unit 17.

The program executing unit 13 executes programs stored in the virtual disk 11a. For example, the program executing unit 13 reads an execution target program from the virtual disk 11a, expands the program on the virtual physical memory 10a and executes the program.

The determining unit 14 determines whether or not the executed program is a monitoring target. For a method of determining whether or not an executed program is a monitoring target, various known methods can be used. By, for example, specifying a monitoring target program name in advance and determining whether or not a program expanded on the virtual physical memory 10a matches with a program specified in advance, it is also possible to determine whether or not the executed program is a monitoring target. Further, when a program is scanned and includes an instruction specified as a monitoring target, it is also possible to determine that the program is a monitoring target.

The virtual HW controller 18 controls transmission and reception of data between the virtual disk 11a and the virtual physical memory 10a and between the shadow disk 11b and the shadow memory 10b. For example, the virtual HW controller 18 stores in the virtual physical memory 10a a program read by the program executing unit 13 from the virtual disk 11a. Further, the virtual HW controller 18 stores in the virtual disk 11a data read by a program or the like from the virtual physical memory 10a. This virtual HW controller 18 includes a taint information propagating unit 18a which propagates a taint tag.

The taint analyzing unit 17 propagates a taint tag to an instruction execution result based on a taint tag propagation rule when data to which the taint tag has been set is passed to an instruction to be executed by the virtual CPU 12 (more specifically, the program executing unit 13). That data to which a taint tag has been set is passed to an instruction to be executed by the program executing unit 13 specifically means that a value passed by an operand of the instruction holds a taint tag.

The taint information propagating unit 18a propagates a taint tag between the shadow disk 11b and the shadow memory 10b in response to that data is read or written between the virtual disk 11a and the virtual physical memory 10a. When, for example, the virtual HW controller 18 stores in the virtual disk 11a data read by a monitoring target program from the virtual physical memory 10a, a taint tag of the read data on the shadow memory 10b is stored on the shadow disk 11b in response to the data storage.

In addition, a rule for propagating a taint tag is that, when the virtual CPU 12 executes a machine language instruction executes one of a arithmetic operation instruction, a logical operation instruction, a data movement instruction and a data copy instruction accompanied by one or more operands, a taint tag is set to a portion, too, at which an instruction execution result is stored. This rule differs depending on an implementation. However, when an instruction execution result depends on a read value, this rule is configured by a basic rule that a taint tag is propagated, and an operation including propagating a taint tag is performed in response to an instruction for handling data in some way among instructions of the virtual CPU 12.

The library function execution monitoring unit 15 captures execution of a library function invoked by a monitoring target program, and generates and outputs a log related to an input and an output to and from this library function (such a log will be optionally referred to as a "log" below). Further, the library function execution monitoring unit 15 sets a taint tag for uniquely identifying an invocation of this library function, to output data from the library function upon generation of a log. In addition, execution of a library function is captured two times at a time when the library function is invoked by an instruction of an analysis target program and at a time upon a return to an instruction of the program after the library function is invoked.

In this regard, following points need to be taken into account to capture execution of a library function executed by a monitoring target program. (1) How to determine a monitoring target program. (2) How to capture that a library function has been executed. (3) How to capture a return from a library function to a code of monitoring target malware.

For (1), a method of using a process ID, a thread ID and a memory address range may be used. For (2), a method of directly rewriting a binary and arranging a hook or a break point or a method of using a hardware break point may be used. Further, a method of capturing execution of an instruction of a library function by using binary conversion and determining by way of comparison whether or not a virtual address of a read instruction and an address at which a library function grasped in advance needs to be arranged match may be used.

As to (3), it is possible to grasp a returning address by checking a return address stacked in a stack and a return address stored in a specific register when execution of a library function is captured in (2). Further, it is also possible to find an instruction which has invoked a library function and determine a next instruction of this instruction is a returning address. When it is possible to grasp a returning address, execution of an instruction of this returning address is captured by registering this address for comparing hooks, break points and addresses according to the same method as the method described above.

When grasping execution of a library function from a monitoring target program, the library function execution monitoring unit 15 grasps an argument input to the library function based on argument information of this library function, obtains data input as the argument to the library function and a taint tag set to this data, and outputs information in which the data and the taint tag are associated, as a log (program analysis log).

In addition, argument information of a library function in which a prototype declaration of this library function is described is obtained. For example, argument information is obtained from a source code of a library function, a header file provided by an SDK (Software Development Kit) or document of a library function.

Further, the library function execution monitoring unit 15 performs the following processing when capturing a return to a program after a library function is invoked. First, the library function execution monitoring unit 15 distinguishes an argument output from a library function based on argument information of the invoked library function, and sets a taint tag to data output from the library function. Further, the library function execution monitoring unit 15 outputs, as a log, information in which data to be output and a taint tag set to this data are associated.

[Example of Log]

Hereinafter, an example of a log output from the library function execution monitoring unit 15 will be described with reference to FIGS. 6A and 6B. FIG. 6A is a view illustrating a log in case where a taint tag is propagated between library functions. FIG. 6B is a view illustrating a log in case where a new taint tag is set per library function. In addition, in FIGS. 6A and 6B, logs are arranged in chronological order and logs are newer toward the bottom of the chronological order.

As illustrated in FIGS. 6A and 6B, a log indicates information indicating whether the log is a log ([prev]) related to an input to an invoked library function or a log ([post]) related to an output, a function name of this library function, information indicating whether or not an argument to this library function is an input (IN) or an output (OUT), data of this argument and a value of a taint tag set to this data. In addition, although not illustrated in FIGS. 6A and 6B, each log includes chronological order information indicating in what order each log has been invoked.

In addition, this log may include a library function name, a module name including this library function, a PID, a TID, an invocation source address, a return address, time information and an address (EIP) pointed by an instruction pointer as additional information of an invocation of this library function.

This log is referred to in order to specify a library function which has generated obfuscation data by a log searching unit 16. An example of a process in which the log searching unit 16 uses a log illustrated in FIGS. 6A and 6B and specifies a library function which has generated obfuscation data will be described below.

In addition, as illustrated in FIG. 3, the host OS 2 includes the log searching unit 16 and the log storage unit 110 outside the virtual machine 10. Thus, the host OS 2 holds the log searching unit 16 and the log storage unit 110 outside the virtual machine 10 to prevent a log and processing of searching for a log from becoming visible for a monitoring target program operating in the virtual machine 10. The log searching unit 16 refers to a taint tag set to output data (obfuscation data) from the virtual machine 10 and logs accumulated in the log storage unit 110, tracks a dependence relationship of data input and output between library functions, and specifies a library function which has generated the output data from the virtual machine 10. This log searching unit 16 will be described in detail below.

The log storage unit 110 stores logs (see FIGS. 6A and 6B) output from the library function execution monitoring unit 15. In addition, the log storage unit 110 associates a log output upon invocation of a library function and a log output upon a return from the library function, in information indicating a function name of the invoked library function, log chronological order information and in what order each library function has been invoked. Further, the logs may be associated by using a relation of an address used to invoke a library function, and a return address, a PID or a TID.

[Processing Process of Virtual Machine]

[Log Accumulating Process]

Figure 7:
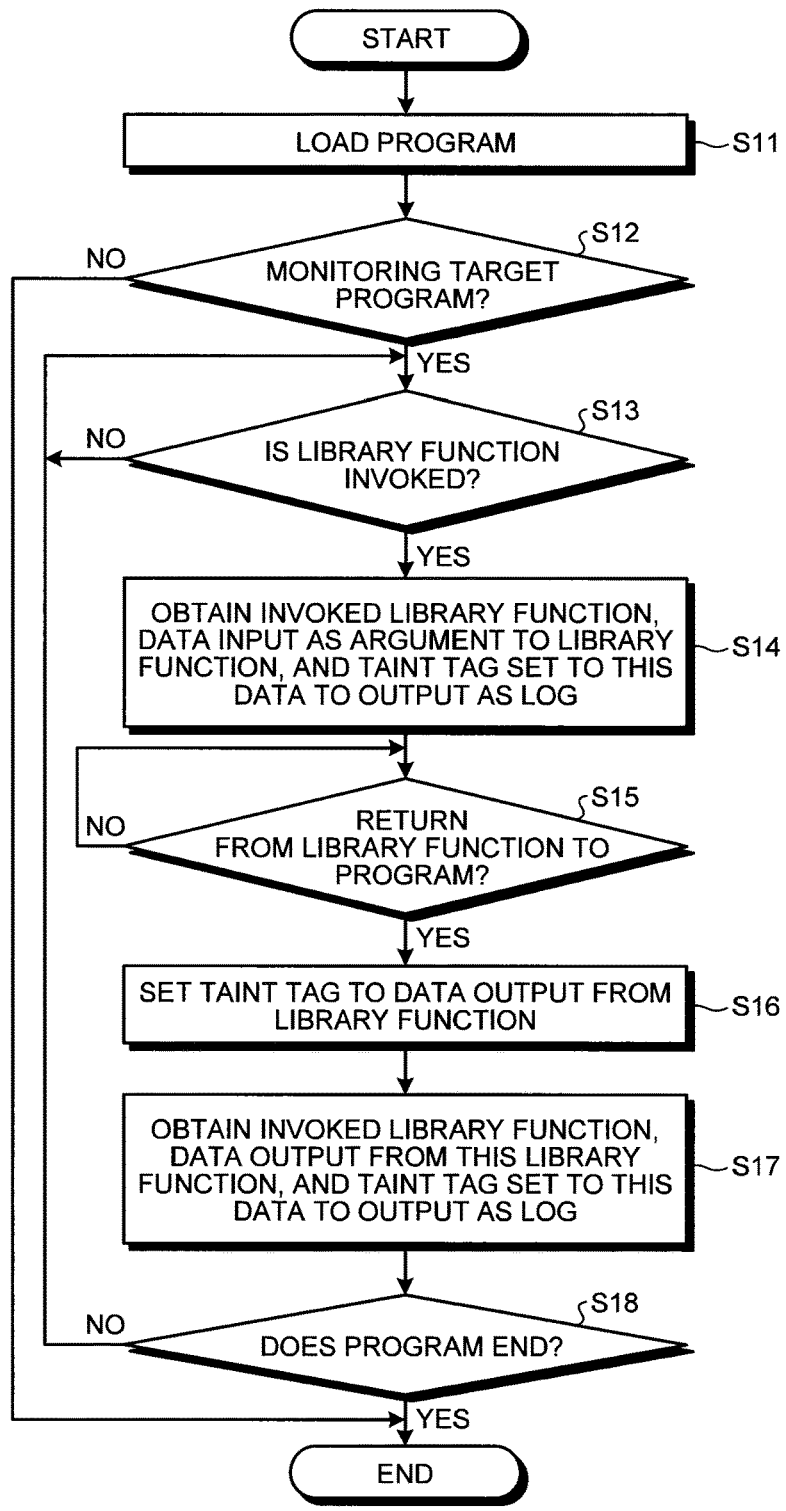
FIG. 7 is a flowchart illustrating a process in which the virtual machine accumulates logs related to an input and an output to and from library functions.

Next, a processing process of the virtual machine 10 will be described with reference to FIG. 7. First, a process in which the virtual machine 10 accumulates logs related to an input and an output to and from a library function will be described. FIG. 7 is a flowchart illustrating a process in which the virtual machine accumulates logs related to an input and an output to and from a library function.

The program executing unit 13 of the virtual machine 10 loads an execution target program from the virtual disk 11a to the virtual physical memory 10a (S11).

Further, the determining unit 14 determines whether or, not the loaded program is the monitoring target program (S12). In addition, when the determining unit 14 determines that the loaded program is not the monitoring target program (No in S12), processing is finished.

Meanwhile, when the determining unit 14 determines that the loaded program is the monitoring target program (Yes in S12), the library function execution monitoring unit 15 determines whether or not this program invokes a library function (S13).

Further, in case where determining that the program has invoked a library function (Yes in S13), the library function execution monitoring unit 15 obtains the invoked library function, data input as an argument to this library function, and a taint tag set to this data, and outputs information in which the library function, the data and the taint tag are associated, as a log to the log storage unit 110 (S14). Meanwhile, when the library function execution monitoring unit 15 determines that the library function is not invoked (No in S13), the processing returns to S13.

When determining a return to the program from the invoked library function after S14 (Yes in S15), the library function execution monitoring unit 15 sets the taint tag to data output from this library function (S16). That is, the library function execution monitoring unit 15 distinguishes an argument output from this library function based on argument information of the invoked library function, and sets a taint tag to data output from the library function.

After S16, the library function execution monitoring unit 15 obtains the invoked library function, data output from this library function and a taint tag set to this data, and outputs information in which the library function, the data and the taint tag are associated, as a log to the log storage unit 110 (S17).

Further, when the library function execution monitoring unit 15 determines that the program executing unit 13 finishes executing the program (Yes in S18), processing is finished. Meanwhile, when the program is not finished (No in S18), the processing returns to S13.

Thus, the virtual machine 10 captures an invocation of a library function according to a monitoring target program, and accumulates logs related to a data input to this library function and a data output from this library function.

[Library Function Specifying Process]

Figure 8:
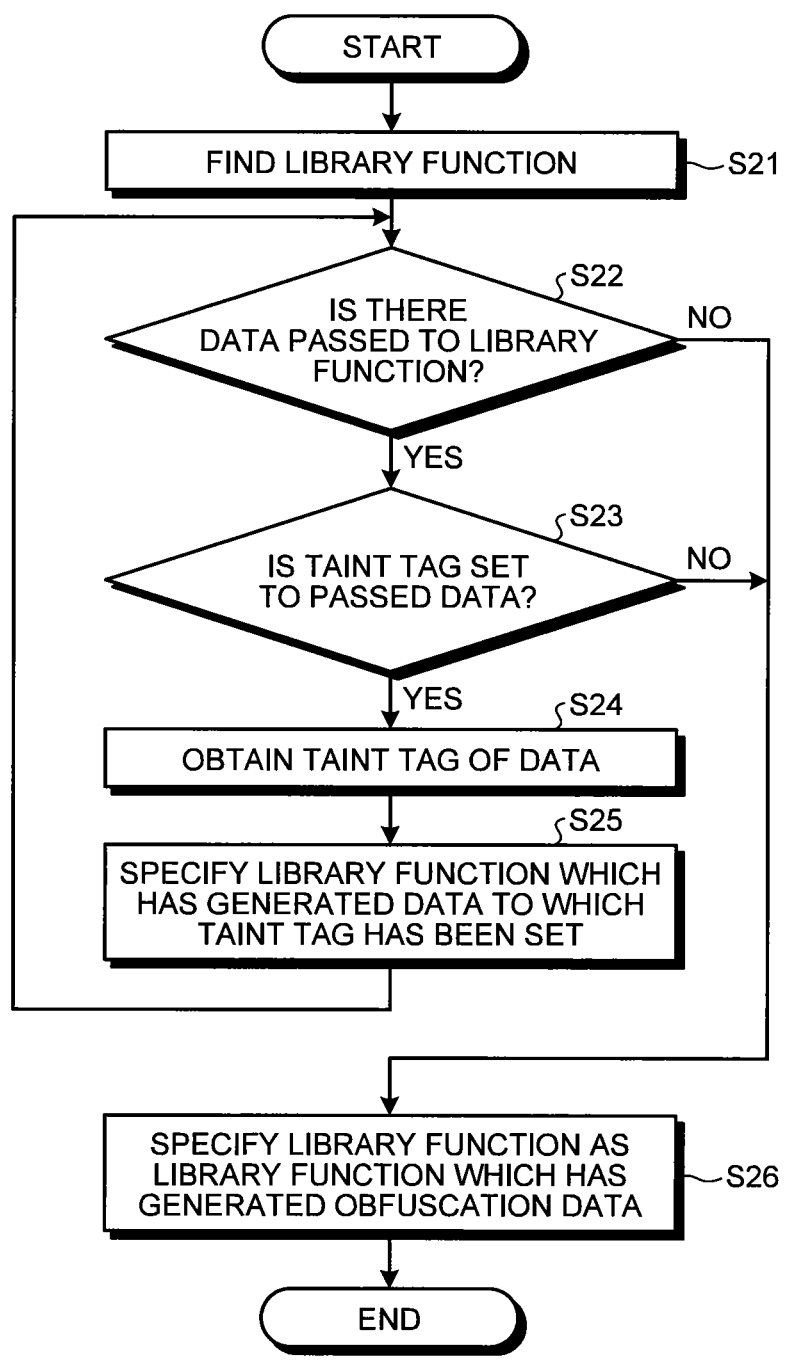
FIG. 8 is a flowchart illustrating a process in which a log searching unit of a host OS specifies a library function which has generated obfuscation data.

Next, a process in which the log searching unit 16 of the host OS 2 searches for logs accumulated in the log storage unit 110, and specifies a library function which has generated obfuscation data will be described with reference to FIG. 8. FIG. 8 is a flowchart illustrating the process in which the log searching unit of the host OS specifies a library function which has generated obfuscation data.

First, the log searching unit 16 refers to the logs accumulated in the log storage unit 110, and finds a library function which has output to the outside the data (obfuscation data) output to the outside of the virtual machine 10 (S21). For example, the log searching unit 16 finds the library function which has output the data by tracking the logs accumulated in the log storage unit 110 in reverse chronological order based on the taint tag to which the output obfuscation data has been set.

After S21, the log searching unit 16 refers to the logs accumulated in the log storage unit 110 and obtains a taint tag of the data (S24) when there is data passed (input) to the library function found in S21 (Yes in S22) and the taint tag is set to the passed data (Yes in S23).

After S24, the log searching unit 16 searches for the logs accumulated in the log storage unit 110, and specifies a library function which has generated data to which the taint tag obtained in S24 has been set (S25). For example, the log searching unit 16 specifies the library function which has generated the data to which the taint tag obtained in S24 has been set, from logs of library functions chronologically prior to the library function found in S21 among the logs accumulated in the log storage unit 110. Further, the log searching unit 16 executes processing subsequent to S22, with respect to the library function specified in S25.

Meanwhile, the log searching unit 16 refers to the logs accumulated in the log storage unit 110 and, when there is not data passed (input) to the library function found in S21 (No in S22) and the taint tag is not set to the passed data (No in S23), the processing moves to S26. Further, the log searching unit 16 specifies the library function as a function which has generated obfuscation data (S26).

Thus, the information processing device specifies the library function which has generated the obfuscation data. Further, when it is possible to specify the library function, a user of the information processing device can estimate data of source information of the obfuscation data based on characteristics of this library function.

When, for example, it is possible to specify the library function which has generated obfuscation data as a library function which has read contents of a given file, it is possible to estimate what type of data the data (source information) read by this library function is based on a file name of this file, a file path, owner information and attribute information allocated to this given file. In addition, when, for example, it is possible to specify a library function as a function which reads contents of a registry, it is possible to estimate a type of source information by specifying a process which has created or registered information of a registry key or a sub key of this registry or a file or a registry key of this registry. By estimating the type of the source information in this way, the user of the information processing device can easily estimate what information malware has leaked to the outside.

Further, this information processing device specifies a library function which has generated obfuscation data based on a log obtained by dynamic analysis of a program, and does not need cost unlike static analysis. That is, the user of the information processing device can estimate what type of data the source information of the obfuscation data output to the outside is without requiring significant cost. In addition, an estimating unit included in the information processing device may estimate data of source information.

In addition, the information processing device may obtain information related to an output destination (communication destination) when obfuscation data is output to an outside. When, for example, obfuscation data is estimated as information related to confidential information in a system, the information processing device may label a propagation destination of this data as a destination of information leak data to monitor.

[Example Where Library Function is Specified]

Hereinafter, an example of a process in which the log searching unit 16 specifies a library function which has generated obfuscation data by using logs accumulated in the log storage unit 110 will be described. Hereinafter, an example where the logs illustrated in FIG. 6A are used will be described.

When, for example, searching for a library function which has generated tag=0x1 from send ( . . . , argument 2: IN: 'yamada': tag=0x1, . . . ) among the logs illustrated in FIG. 6A, the log searching unit 16 finds [post]GetComputerName. Thus, the log searching unit 16 can specify as GetComputerName the library function which has generated data propagated according to send, and the user of the virtual machine 10 can predict that data sent according to send is a computer name.

Meanwhile, the log searching unit 16 specifies a library function by using a log of a different value of a taint tag as illustrated in FIG. 6B per library function as follows.

When, for example, searching for a library function which has generated tag=0x2 from send ( . . . , argument 2: IN: 'yamada': tag=0x2, among the logs illustrated in FIG. 6B, the log searching unit 16 finds [post]memcpy. Next, logs upon an input of [post]memcpy are [prev] memcpy, argument 1: OUT and argument 2:

IN: 'yamada': tag=0x1, and therefore, when searching for the library function which has generated tag=0x1, the log searching unit 16 finds [post]GetComputerName. Thus, the log searching unit 16 specifies that the library function which has generated data sent according to send, as GetComputerName.

In addition, the library function specified by the log searching unit 16 may be a library function (e.g. GetComputerName in FIGS. 6A and 6B) which has processed source information of obfuscation data or may be all library functions (e.g. GetComputerName, memcpy and send in FIGS. 6A and 6B) invoked until this obfuscation data is output. Further, the log searching unit 16 may output information indicating a dependence relationship between library functions (e.g. send←memcpy←GetComputerName) invoked until this obfuscation data is output, and data used by each library function. By so doing, the user of the virtual machine 10 can easily estimate what information source information of the obfuscation data is.

Second Embodiment

Further, a library function execution monitoring unit 15 in the above embodiment may set a taint tag to data when the taint tag is not set to data which has output a library function upon a return from this library function in a program. Furthermore, the library function execution monitoring unit 15 may output output data from this library function and a taint tag as logs to the log storage unit 110.

That is, the library function execution monitoring unit 15 outputs a tag set to output data from this library function, to a log upon generation of the log when a taint tag is set to output data from an invoked library function. Meanwhile, the library function execution monitoring unit 15 sets a tag for uniquely identifying an invocation of this library function, and outputs the tag to the log upon generation of the log when the taint tag is not set to output data from the library function.

By so doing, when, for example, a library function is a function which performs encryption or obfuscation processing, and even when this processing performed by the library function disappears a taint tag set to data input to this library function, it is possible to propagate the taint tag to input data to a library function which performs processing next. Consequently, a log searching unit 16 can specify a library function which has generated source information of obfuscation data by tracking a taint tag of a log.

Other Embodiment

Further, a case where a library function execution monitoring unit 15 captures execution of a library function upon a return to an analysis target program from the library function, and a taint tag is set to output data from this library function has been described. However, the present invention is not limited to this. For example, the library function execution monitoring unit 15 may watch an operation of writing an instruction in a library function, in a virtual physical memory 10a, and set a taint tag every time the instruction is written. That is, the library function execution monitoring unit 15 may collectively set taint tags to output data from a library function upon a return from a library function, or may set a taint tag every time an instruction is written in the virtual physical memory 10a in the library function.

In addition, a virtual machine 10 may use a process virtual machine which uses Binary Instrumentation and virtualizes only a specific process or may use virtualization by mounting a host OS and a virtual machine monitor in the same layer similar to Xen or KVM (Kernel-based Virtual Machine) instead of a virtual machine monitor which operates as an application. Further, HW (hardware) support such as Intel (registered trademark)-VT (Virtualization Technology) may be used for virtual mounting.

Furthermore, a log searching unit 16 may determine which argument of a taint tag is used to search for logs based on a declaration or prototype information of a library function upon searching for a log in S25 in FIG. 8. By so doing, the log searching unit 16 can efficiently search for logs even when, for example, a plurality of arguments is given as input values (input data) to a library function, and enhance precision for specifying a library function. In addition, this search target argument may be specified per library function or which input argument is tracked may be specified according to an output argument of a library function.

Further, all or part of processing which is automatically performed among each processing described in the present embodiment can also be manually performed. Further, all or arbitrary part of each processing function performed by each device can be realized by a CPU or a program analyzed and executed by the CPU, or by hardware which uses a wired logic.

[Program]

Further, it is also possible to create a monitoring program configured by describing processing executed by the information processing device, by a language which a computer can execute. In this case, when the computer executes the monitoring program, it is possible to provide the same effect as that in the above embodiment. Further, by recording this monitoring program in a computer-readable recording medium, and causing the computer to read the monitoring program recorded in this recording medium and execute the monitoring program, the same processing as that in the above embodiment may be realized. An example of the computer which executes the monitoring program which realizes the same function as that of the information processing device illustrated in FIG. 1 will be described below.

Figure 9:
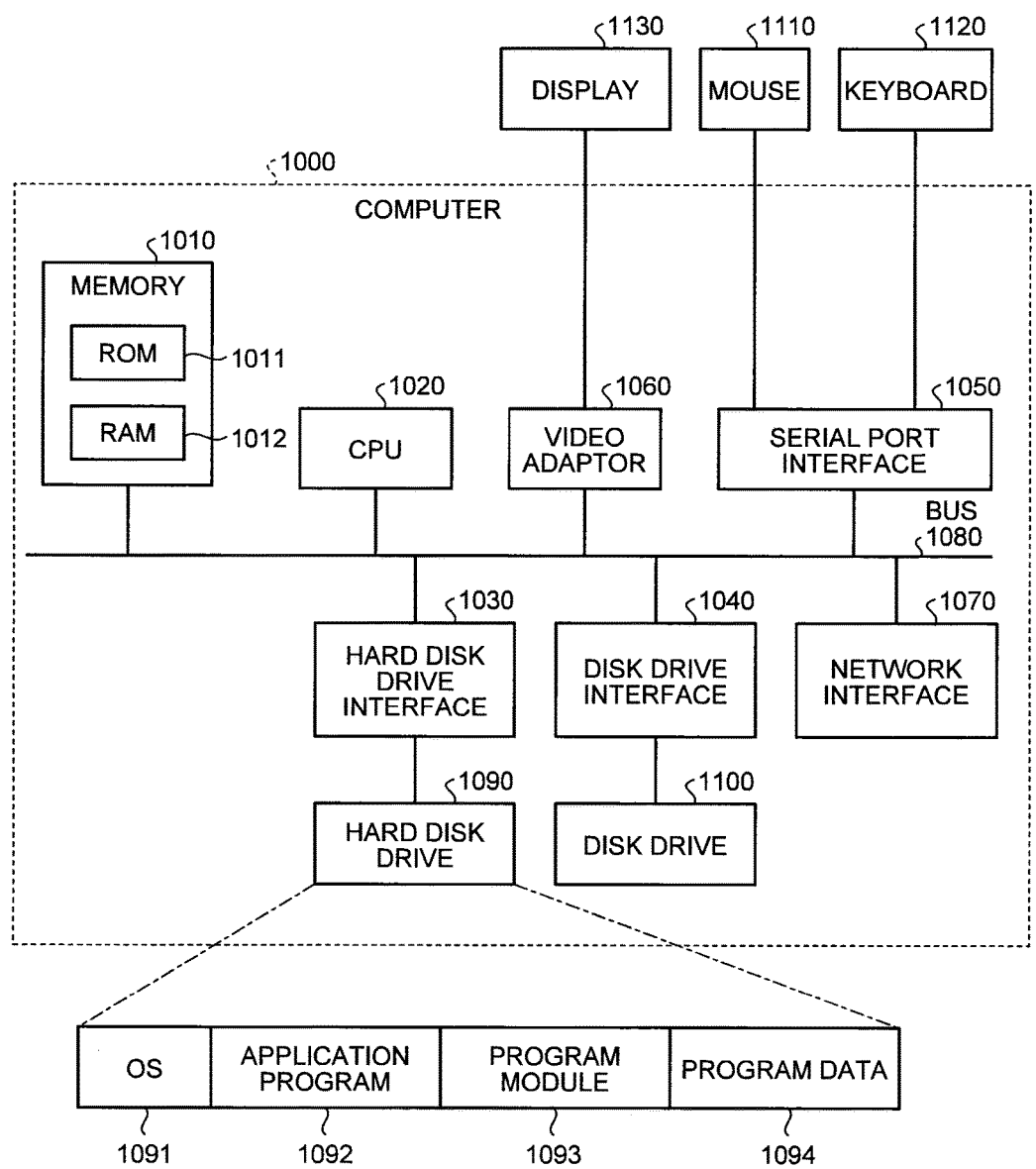
FIG. 9 is a view illustrating a computer which executes a monitoring program.

FIG. 9 is a view illustrating the computer which executes the monitoring program. As illustrated in FIG. 9, a computer 1000 includes, for example, a memory 1010, a CPU 1020, a hard disk drive interface 1030, a disk drive interface 1040, a serial port interface 1050, a video adaptor 1060 and a network interface 1070. Each of these units is connected through a bus 1080.

The memory 1010 includes a ROM (Read Only Memory) 1011 and a RAM 1012. The ROM 1011 stores a boot program such as a BIOS (Basic Input Output System). The hard disk drive interface 1030 is connected to a hard disk drive 1090. The disk drive interface 1040 is connected to a disk drive 1100. For example, a detachable recording medium such as a magnetic disk or an optical disk is inserted in the disk drive 1100. The serial port interface 1050 is connected with, for example, a mouse 1110 and a keyboard 1120. The video adaptor 1060 is connected with, for example, a display 1130.

In this regard, as illustrated in FIG. 9, the hard disk drive 1090 stores, for example, an OS 1091, an application program 1092, a program module 1093 and program data 1094. The monitoring target program described in the above embodiment is stored in, for example, the hard disk drive 1090 or the memory 1010.

Further, the monitoring program is stored in, for example, the hard disk drive 1090 as a program module in which instructions executed by the computer 1000 are described. More specifically, the program module in which instructions executed by a program executing unit 13, a determining unit 14, the library function execution monitoring unit 15 and the log searching unit 16 are described is stored in the hard disk drive 1090.

Further, data used for information processing by the monitoring program is stored as program data in, for example, the hard disk drive 1090. Furthermore, the CPU 1020 reads the program module or program data stored in the hard disk drive 1090, to the RAM 1012 when necessary, and executes each of the above processes.

In addition, the program module or the program data related to the monitoring program may not only be stored in the hard disk drive 1090 but also be stored in a detachable recording medium by the CPU 1020 through the disk drive 1100. Alternatively, the program module or the program data related to the monitoring program may be stored in another computer connected through a network such as a LAN (Local Area Network) or a WAN (Wide Area Network), and read by the CPU 1020 through the network interface 1070.

REFERENCE SIGNS LIST

1 HARDWARE
3 VIRTUAL MACHINE SOFTWARE
10 VIRTUAL MACHINE
10a VIRTUAL PHYSICAL MEMORY
10b SHADOW MEMORY
11a VIRTUAL DISK
11b SHADOW DISK
12 VIRTUAL CPU
13 PROGRAM EXECUTING UNIT
14 DETERMINING UNIT
15 LIBRARY FUNCTION EXECUTION MONITORING UNIT
16 LOG SEARCHING UNIT
18 VIRTUAL HW CONTROLLER
18a TAINT INFORMATION PROPAGATING UNIT
110 LOG STORAGE UNIT

The invention claimed is:

1. An information processing system comprising:
a memory; and
processing circuitry configured to
when an analysis log of a monitoring target program is generated, capture a library function invoked by the monitoring target program which processes source information, the library function being included as part of an operating system of the information processing system;
store, in the memory, the analysis log including at least input data to the library function together with a tag for uniquely identifying the invocation of the library function every time the library function is invoked during the processing of the source information;
specify a library function invoked during the processing of the source information by using as a key the tag set to the stored analysis log; and
extrapolate the source information based on characteristics of the specified library function, even when obfuscation data remains obfuscated,
wherein the processing circuitry
when the tag is set to output data from the library function and when the analysis log of the monitoring target program is generated, propagates the tag set to the output data from the library function to any subsequent processing performed by a next library function that is invoked by the monitoring target program, and
when the tag is not set to the output data from the library function and when the analysis log of the monitoring target program is generated, sets the tag for uniquely identifying the invocation of the library function to be propagated to any subsequent processing performed by a next library function that is invoked by the monitoring target program.

2. The information processing system according to claim 1, wherein
the processing circuitry is further configured to propagate the tag, to data of an execution result of the monitoring target program.

3. The information processing system according to claim 2, wherein the tag is not set to the output data from the library function when the library function is a function that performs encryption or obfuscation processing.

4. The information processing system according to claim 1, wherein the processing circuitry specifies the invoked library function based on a predetermined argument among tags set to the analysis log stored in the memory.

5. An information processing method causing an information processing system to execute:
when an analysis log of a monitoring target program is generated, capturing a library function invoked by the monitoring target program which processes source information, the library function being included as part of an operating system of the information processing system;
storing, in a memory, the analysis log including at least input data to the library function together with a tag for uniquely identifying the invocation of the library function every time the library function is invoked during the processing of the source information;
specifying a library function invoked during the processing of the source information by using as a key the tag set to the stored analysis log; and
extrapolating the source information based on characteristics of the specified library function, even when obfuscation data remains obfuscated,
wherein the method further includes
when the tag is set to output data from the library function and when the analysis log of the monitoring target program is generated, propagating the tag set to the output data from the library function to any subsequent processing performed by a next library function that is invoked by the monitoring target program, and
when the tag is not set to the output data from the library function and when the analysis log of the monitoring target program is generated, setting the tag for uniquely identifying the invocation of the library function to be propagated to any subsequent processing performed by a next library function that is invoked by the monitoring target program.

6. A non-transitory computer readable medium including computer executable instructions, wherein the instructions, when executed by an information processing system, cause the information processing system to perform a method comprising:
when an analysis log of a monitoring target program is generated, capturing a library function invoked by the monitoring target program which processes source information, the library function being included as part of an operating system of the information processing system;
storing, in a memory, the analysis log including at least input data to the library function together with a tag for uniquely identifying the invocation of the library function every time the library function is invoked during the processing of the source information;
specifying a library function invoked during the processing of the source information by using as a key the tag set to the stored analysis log; and
extrapolating the source information based on characteristics of the specified library function, even when obfuscation data remains obfuscated,
wherein the method further includes
when the tag is set to output data from the library function and when the analysis log of the monitoring target program is generated, propagating the tag set to the output data from the library function to any subsequent processing performed by a next library function that is invoked by the monitoring target program, and
when the tag is not set to the output data from the library function and when the analysis log of the monitoring target program is generated, setting the tag for uniquely identifying the invocation of the library function to be propagated to any subsequent processing performed by a next library function that is invoked by the monitoring target program.

* * * * *